Figure 1:
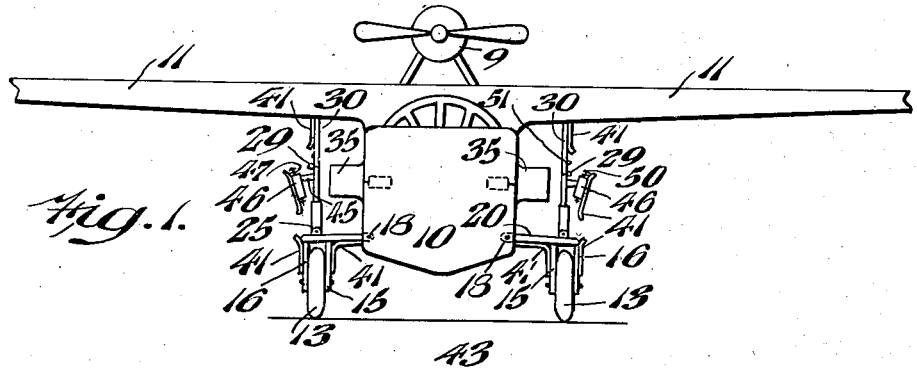

Dec. 19, 1939.  W. L. SUTTON  2,184,260
LINKAGE SYSTEM
Filed April 15, 1938   3 Sheets-Sheet 1

INVENTOR
WILSON L. SUTTON,
BY
Frank H. Borden
ATTORNEY

Dec. 19, 1939.  W. L. SUTTON  2,184,260
LINKAGE SYSTEM
Filed April 15, 1938  3 Sheets-Sheet 2

INVENTOR
WILSON L. SUTTON,
BY
Frank H. Borden
ATTORNEY

Dec. 19, 1939.   W. L. SUTTON   2,184,260
LINKAGE SYSTEM
Filed April 15, 1938   3 Sheets—Sheet 3
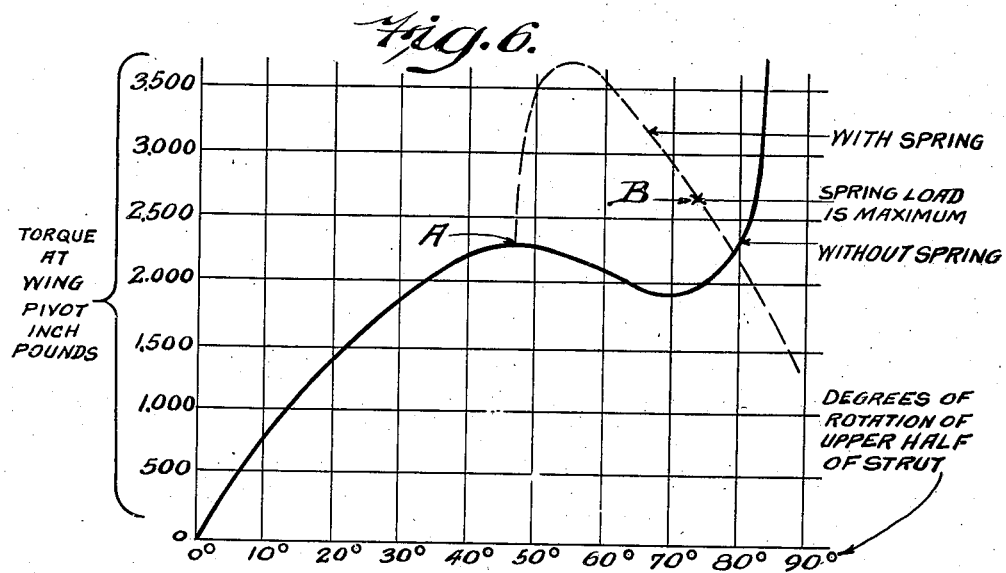
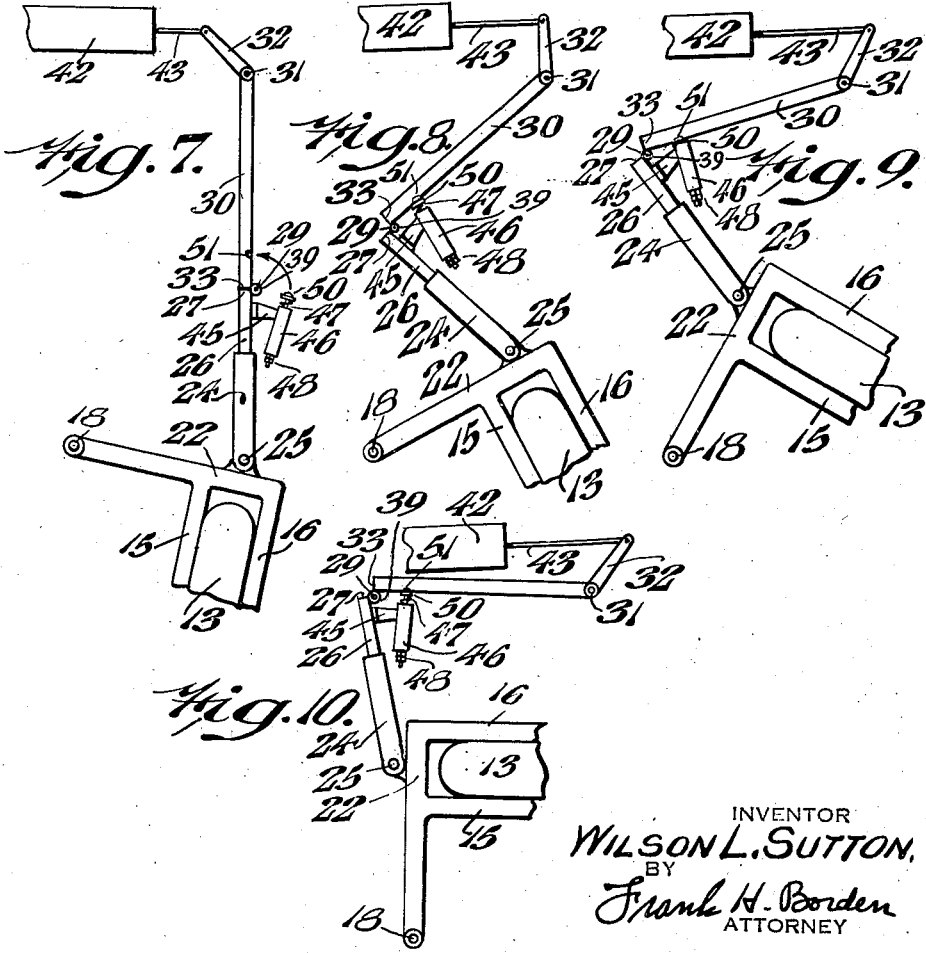
INVENTOR
WILSON L. SUTTON,
BY
Frank H. Borden
ATTORNEY Patented Dec. 19, 1939

2,184,260

UNITED STATES PATENT OFFICE 2,184,260

LINKAGE SYSTEM

Wilson L. Sutton, Bristol, Pa., assignor to Fleetwings, Inc., Bristol, Pa., a corporation of Delaware Application April 15, 1938, Serial No. 202,168

15 Claims. (Cl. 244—102)

This invention relates to linkage systems, and particularly to landing gear linkage systems.

It is among the objects of the invention; to provide improvements in the art of linkage systems; to provide improvements in the art of retractible landing gears; to provide a landing gear particularly adapted for use on amphibian aircraft; to provide a retractible landing gear of simplicity and practicability; to provide a retractible landing gear of high efficiency in extension and of minimum wind resistance when retracted; to provide a landing gear which is clean and well faired both in extension and retraction; to provide a landing gear for amphibians in which in retraction the wheels are well above the lower surface of the craft and therefore out of direct contact with the water; to provide a gear such that in distended or extended position the landing loads are taken as a substantially straight line thrust upwardly of the main spar or front of the wing structure; to provide a gear which obviates a cutting of the chine of the craft; to provide a landing gear which can be hydraulically locked as well as actuated; to provide a landing gear free from cable and other ties for actuation; to provide a landing gear which utilizes a simple hydraulic gear for both extension and retraction; to provide a landing gear including a lever pivoted in a wing with an actuating device housed in the wing with which the gear is associated; to provide a landing gear having an actuating power source with an auxiliary torque-controlling device by which the power requirements for actuation are predetermined and fixed; to provide a preloaded spring element operable at a predetermined point in the actuation of the landing gear to complete a desired gear movement; to provide a new mechanical movement; to provide a system of links and levers with power means such as to secure a predetermined angular relation of the links; to provide a system of links with means generating torque about a pivot, with auxiliary power means to assist the torque generation to secure a predetermined positioning of the links; to provide a gear tending to fall by gravity to its extended position; to provide a pair of hinged members with a resilient agency effective about the hinge at a predetermined angularity thereof to exert torque about said hinge to increase the relative angularity of the members; to reduce the power necessary to actuate landing gear linkages; and many other objects and advantages as will become more apparent as the description proceeds.

Using a landing gear as a purely illustrative exemplification of an invention broader than such specific use and application, a lever is provided pivoted to swing through approximately 90°, with power means to create torque to move the lever on its pivot, a link is provided pivoted at one end to an end of the lever and at the other end is guided in a substantially arcuate path, by means of a second pivoted link to which it is pivotally connected, with resilient means operatively associated with the lever and first link about the pivot between them for variation of loading at a predetermined angular relation between the link and lever to store energy therein. The first link arranged to swing with the lever from a position of substantial alignment therewith at 180°, at which angle together they form a strut, through a continuously reducing relative angularity to an acute angle of less than 90° during which the resilient means has its loading varied to store energy and thereafter to swing through a continuously increasing angle reapproaching 90°, as the 90° limit of lever movement on its pivot is approached, during which latter movement the resilient means has its loading oppositely varied and the stored energy released to cause divergence of the first link and the lever to urge them resiliently toward the ultimate angular positioning of approximately 90°, when the power means is otherwise ineffective to cause such angular positioning.

Figure 2:
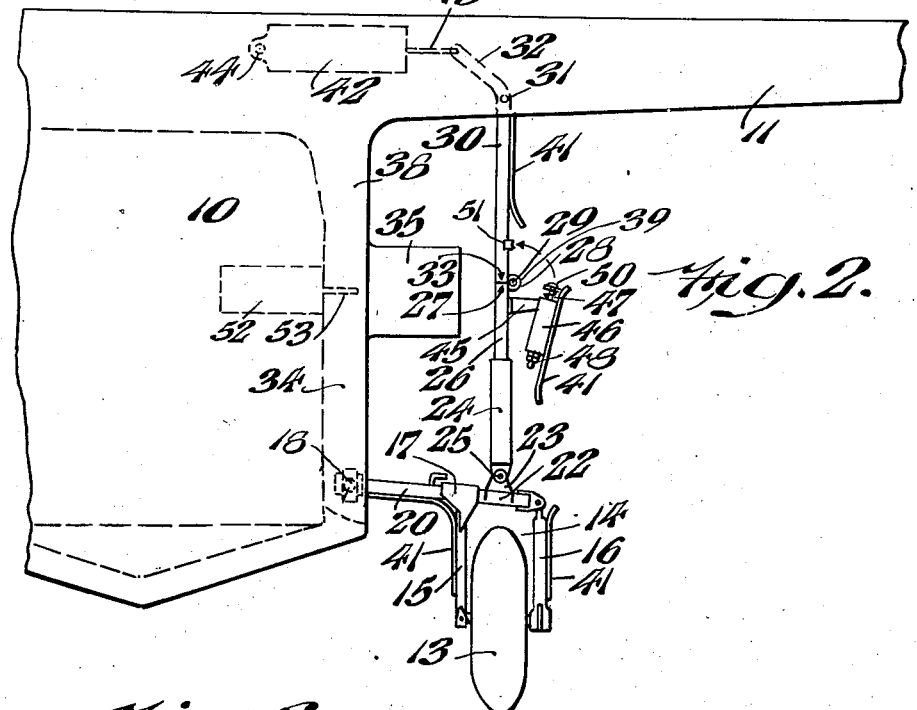
Figure 3:
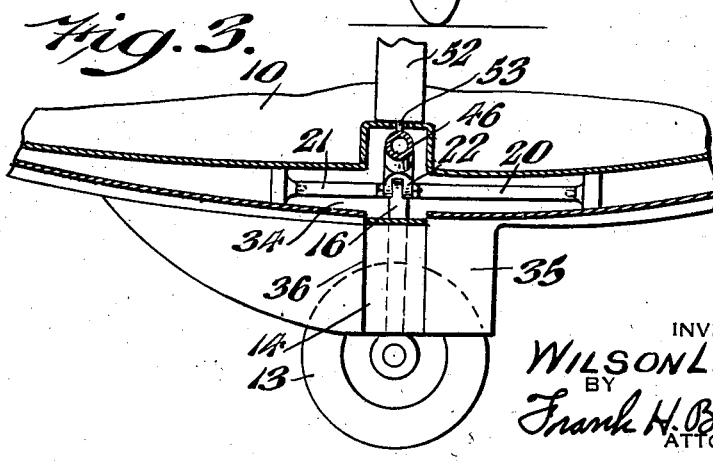
Figure 4:
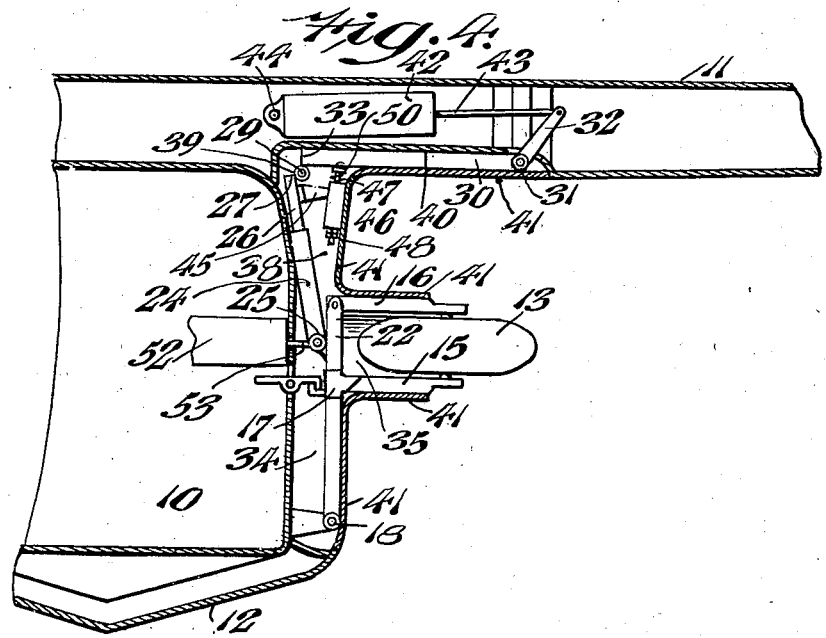
Figure 5:
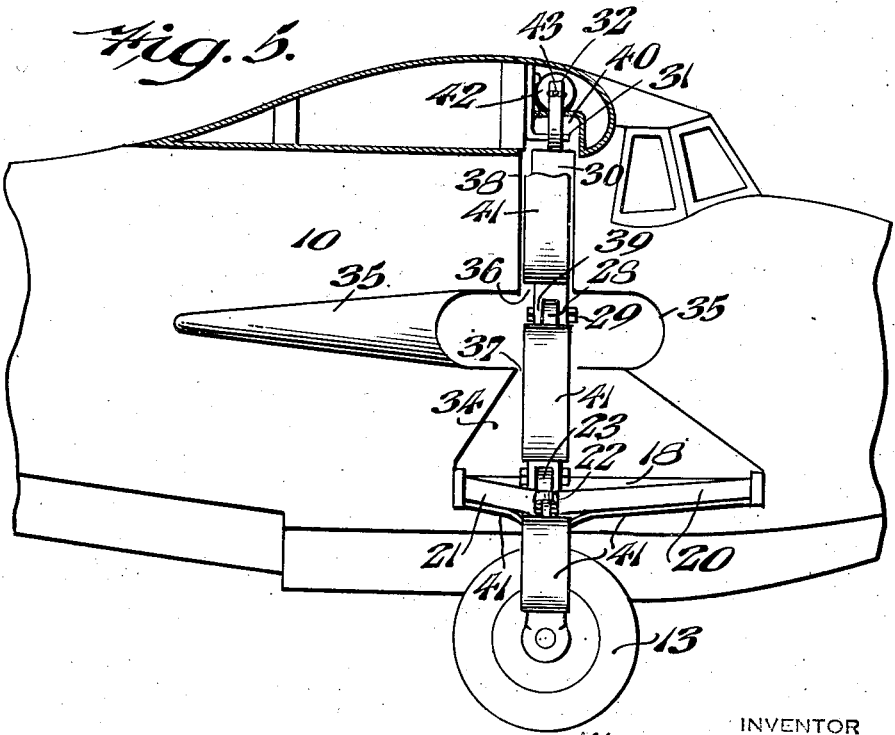

In the accompanying drawings forming part of this description:

Fig. 1 represents a diagrammatic front elevation of an airplane having a retractible landing gear constructed in accordance with the system of linkage involved herein with both landing gear components extended, Fig. 2 represents an enlarged fragmentary detail view of the right hand portion of Fig. 1 with the landing gear extended and the linkage in one extreme angular relation, Fig. 3 represents a fragmentary plan, partially in section, of the housed or faired retracted landing gear of Fig. 2, Fig. 4 represents an enlarged fragmentary detail of the right side of the elevation of Fig. 1, with the landing gear parts in retracted position and with the linkage in another extreme angular relation opposite to that of Fig. 2, Fig. 5 represents a side elevational view of the landing gear of the preceding figures, with the landing gear extended, Fig. 6 represents a diagram of the power curve in terms of inch pounds of torque at the bell crank pivot plotted against angular positioning of the bell crank lever about its pivot in full lines, showing that the curve extends toward infinity and requires an uncertain and indefinitely great source of power greater than can ever be available, while showing in dotted lines the incidence on the curve of the preferably preloaded resilient device by which the power requirement to secure both bell crank motion and actuation of the device has a definite obtainable upper limit by which the predetermined complete link swinging is secured within the range of the power available, and Figs. 7 to 10 inclusive represent diagrammatically and illustratively the successive positions of the linkage system in swinging from one extreme angular positioning to the other, with the auxiliary resilient or spring device in various operated positions, respectively.

Although for illustrative purposes the landing gear shown and described herein is particularly available for a high wing monoplane type of aircraft, it will be understood that the invention is not to be construed as so limited, as it may readily be used with bi-planes, or other types of aircraft, as well as with other types of agencies altogether.

The fuselage 10 of the airplane structure is indicated generally as of a boat hull, having wings 11, placed high above the bottom 12 of the hull or fuselage. The aircraft may be propelled in any desired manner, as by motors carried by the fuselage or wings, and illustratively by the single motor 9, mounted above the wing.

The landing wheels 13 are each respectively mounted in yokes or clevises 14 having the rigid internal leg 15, and the external removable leg 16. The rigid leg 15 is mounted on a terminal 17 forming the apex of a triangle comprising the base strut 18, journalled in an opening to be described, in the side of the fuselage on an axis substantially longitudinal thereof, from which the forward and rearward struts respectively 20 and 21 extend toward the apex terminal 17, and are rigidly secured thereto. The triangle has a rigid tail member or shank 22, also mounted in the terminal 17, extending over the wheel, and to which the removable leg 16 is pinned. The shank 22 comprises part of the yoke 14, and has a substantially central pivot member 23 to which the shock absorbing strut 24 is pivotally connected as at the pivot 25. The triangular strut assembly comprising the support for the wheel is capable of swinging to retract the wheel, about an axis substantially concentric with the base strut 18 thereof and comprises the "second" link in the system of links and levers previously discussed.

The shock absorbing strut member 24 has at its upper end a complemental shock strut member 26 having a plane upper end 27 perpendicular to the axis of the strut, with the offset hinge element or pintle 28 lying in the plane of the end 27, but eccentric thereto, with the hinge axis 29 substantially parallel to the axis of the strut 18 of the wheel-supporting triangle. This comprises the "first link" of the described system, and in the extended landing gear position of Fig. 2, for instance, on the ground, the angular relation of the first and second links approaches 90°.

A bell crank or analogous lever 30 has a pivot 31 within the wing and vertically in substantial alignment with the pivot 25 of the shock strut 24 and the yoke 14 in the extended position of the gear, has a short end within the wing, as at 32, and the longer end terminates in a substantially plane end 33, having the offset hinge element 39 engaging pintle 28 of strut 24, about common axis 29. The meeting faces 27 and 33 lie in planes containing the axis 29. The arrangement, as will be clear, is that when the gear is extended and in contact with the ground, a line passes vertically through the center of thrust from the landing load through the pivot 25, through the shock strut, centrally of the meeting juxtaposed flat faces or ends of the adjacent portions of the bell crank and link, and through the pivot 31 in the wing, and as pivot 31 is mounted directly on the main or front spar of the wing, the loads are easily and directly absorbed thereby. The assembly comprises in effect a toggle system of links. Obviously the relation of the bell crank and shock strut in Fig. 2, for instance, is such as to prevent breaking of the toggle alignment as an incident of vertical axial pressure only, owing to the offset hinge as will be clear. With all of the axes in parallelism longitudinally of the fuselage, the only way the toggle connection of the bell crank and strut can break, from the aligned position of Fig. 2, is toward the fuselage, on the way toward retraction. It cannot break outwardly because of the offset hinge. The movement toward retraction finds the wheel bracket swinging on its axis 18, upwardly, the bell crank swinging on its axis 31, with the end 33 swinging toward the fuselage end of the wing, and the shock strut 24—26 moving bodily laterally toward the fuselage.

The fuselage is provided with a triangular recess 34 in the side, in the lower leg or base of which the base strut 18 of the wheel support is mounted, leading to the open-mouthed, or laterally open-ended fairing 35 having the top and bottom slots 36 and 37 respectively, leading from the triangular lower recess 34, through the fairing 35 to the substantially vertical slot 38 in the fuselage, communicating in turn with the longitudinal slot in the lower surface of the wing as at 40, and in which latter is pivoted the bell crank 30.

It will be apparent that with the parts properly swung to retraction the entire system of linkage will be housed and the only exposed elements will be the fairing 35 and the protruding portion of the wheel 13 extending from the fairing. To complete the minimization of drag the landing gear elements of links and levers will carry the respective externally mounted fairing or aperture-closing sheets 41, suitably contoured for the purpose, so arranged as to substantially close the respective slots and recesses in the fuselage, wheel fairing and wing when the linkage is housed as the landing gear is retracted.

In the desired housed position with the wheel mounted in the fairing it will be observed that the shock absorbing strut comprised of lever 30 and shock link 24—26 has been "broken" and forced to assume a position with the adjacent legs, of lever and link, almost at right angles, with the bell-crank 30 swung upwardly to lie within the recess 40 in the under surface of the wing. At this juncture also the link 24—26 and 20—22, etc., (the first and second links) have moved from a relative angular position approximating 90°, to an approximation of substantial alignment. The complete proper retracted and housed position of the links and lever in which the wheel 13 is properly faired and extends substantially perpendicularly from the side of the fuselage, finds the three pivots, respectively 29, between the lever and first link, 25, between the first and second links, and 18, on the second link, in a straight line slightly inclined inwardly from the vertical toward the fuselage center.

It will be clear that in swinging the linkage from the positions of Figs. 2 or 7, to that of Figs. 4 or 10, the effective substantially horizontal component of the moment about axis 31 is greatest at the beginning when the 180° strut is first broken at the inception of the retracting movement, and decreases progressively to a point approaching zero as the lever approaches its ultimate 90° positioning substantially parallel to the horizontal. It will therefore be clear that as the effective substantially horizontal component approaches zero there will be a relative angular position of the linkage at which a condition of balance will be established between the effective lateral or horizontal component and the effective friction and work, and obviously this angular positioning will be reached prior to the attainment of the ultimate seated position of the parts. The friction and effective work remaining cannot be overcome by the small lateral component available from the lever regardless of the torque at the axis 31, which therefore may increase infinitely without completing the collapsing and retraction of the linkage, and its final desired disposition with the three axes in substantial alignment.

It is because of the fact just described, that it has not heretofore been considered generally possible to utilize a single hydraulic agency working about a pivot in the wing for the extension and retraction of toggle-jointed landing gears, without the use of cables, gears, and the like, or of auxiliary power devices operative on the toggle-joint itself. While with such cables and the like the pivot of the linkage can be forced directly to the point desired, such devices are cumbersome, impose drag, involve excess weight, and require too much time for operation, among other disadvantages. It is a primary object of this invention to provide a system of linkage with means insuring a complete retraction from an extended position, with a single hydraulic agency effective on one side only of the lever about the fixed pivot.

Preferably a hydraulic cylinder 42 is mounted suitably in the wing either actuating a crosshead or the like from which a connection extends to the short arm 32 of the lever, or the piston includes a rod 43 pivotally connected to the said short arm 32 of the lever, within the wing. To provide even thrust from the connection 43 to the arm 32, the cross-head (not shown) may be resorted to, as suggested above, or else the cylinder 42 may be provided with a pivotal connection 44 or the like, by which it may be secured to the spar of the wing, for instance, and be susceptible to swinging to maintain alignment of the connection 43 with the cylinder 42 and with the pivot in the end of short arm 32. Suitable power and exhaust lines to the cylinder (not shown) will be provided to cause the connector to be positively pushed outwardly, or, selectively, pulled inwardly of the cylinder to push or pull arm 32 to swing lever 30 about pivot 31. The cylinder and piston would be ineffective alone to swing the lever 30 through a full 90° with the attached linkage forced into housed properly disposed relation with the three pivots aligned.

It is necessary therefore and is a feature of the invention to provide an auxiliary device by which the complete retraction of the landing gear is automatically secured by the expenditure of a predetermined and limited power input in the cylinder 42. The preferred embodiment of device is one that at the proper movement exerts in effect a final lateral thrust on the pivot 25 to bring the wheel to housed relation, while aligning the three pivots, and of course moving the bell crank lever through its final few degrees of movement to complete its substantially 90° of swing on pivot 31. The auxiliary device according to this invention comprises a resilient means preferably preloaded and effective at predetermined angular relations of the link and lever.

The upper member 26 of the shock strut 24 supports a laterally extending bracket 45 upon which the cylinder 46 is rigidly mounted at a predetermined slight angularity relative to the supporting strut member 26. Illustratively approximately 15° of inclination has been found satisfactory. Within the cylinder is a compression spring 47 which is suitably preloaded or compressed, as by the adjusting nut or bolt head 48 extending from the lower end of the cylinder or otherwise, and at its upper end is provided with a contact or follower button or plate 50. It will be understood that the follower 50 can be forced toward and possibly even into the cylinder 46, under axial or substantially axial presure, on the plate, against the resilient resistance of the spring 47, which obviously can only be overcome by force such as to first overcome or take up the initial and variably predetermined preloading of the spring 47, and thereafter to increase the loading of the spring and to store up energy during the compression and maintenance of the compression. Obviously, in resiliently moving the follower button back to its initial position the stored energy in excess of the preloading will be expended. The button may be at any suitable place, but a satisfactory normal disposition thereof is such that when the landing gear is completely retracted and the wheel 13 is housed in its fairing, the button 50 is in firm contact with the cup 51 on the adjacent end of the lever, and possibly still retains a little of the excess stored energy incident to its compression in a manner to be described. The button should normally be disposed slightly below the plane of the meeting faces 27 and 33 of the lever and link, depending upon the existence and amount of resilient preloading imparted to the device. It will be understood that actual preloading may not be necessary if the resilient device is so disposed that the compression of the spring is initiated as soon as the toggle linkage begins to move. However, an appreciable preloading is preferred.

Referring to Fig. 6 the chart indicates diagrammatically and purely illustratively by the solid line curve the torque in inch pounds at the axis 31, for the 90° movement of the lever 30 from the vertical aligned landing position to the extreme retracted position in which the linkage is housed and the extending wheel is faired. It will be clear that the torque necessary to "break" the toggle alignment at the start of the retraction will be inappreciable, and can be considered as zero, and that the torque increases as a direct substantially linear function of the angular motion of the lever 30 about its axis 31 until practically 40° of lever movement has been attained; after which the curve departs from the linear and drops or decreases slightly during the lever movement from about 45° to 75°, probably as an incident of the change in attitude of the wheel carrying secondary link at which gravity has a very small effect on the movement of the link. However, from about 75° of lever movement the torque begins to increase rapidly, until after about 80° of lever movement the curve slopes toward infinity, passing out of the chart beyond 3700 inch pounds. Using the heavy solid line of the curve it will be clear that the lever 30 will not attain the 90° of movement, regardless, substantially, of the torque applied.

With the resilient device of the invention mounted on the first link of the system in position to engage the lever as the lever and link assume an increasingly more acute angular relationship, the torque at pivot 31 in inch pounds follows a curve comprised of the solid line to its juncture with the dotted line, and the curve then follows the dotted line. Thus for approximately 40° to 48° the torque bears the same relation to the angular displacement of the lever 30, as without the resilient booster, as the device may be designated. At this point the linkage has assumed the position diagrammatically shown in Fig. 8, at approximately 48° of lever motion from the vertical, and the follower 50 has just contacted the cup 51 on the lever. This point is diagrammatically illustrated on the chart by the letter A. Pursuant to the contact of the cup 51 on the lever with the follower plate or button 50 of the resilient device mounted on the first link 26—24, the ensuing lever movement through the next few degrees of movement on its axis 31 to a position of approximately 50° of lever movement finds the torque increasing and running up to a peak, illustratively terminating at approximately 2700 inch pounds, as the follower is pushed toward the cylinder 46 and the spring 47 is begun to be compressed as the preloading of the spring is absorbed by the lever in the continued change of relative angularity of the lever and first link toward the most acute relation.

The curve, shown in dotted lines, in place of extending toward infinity as does the unaided or unboosted curve of the torque, after reaching a definite determinable and attainable peak, then is characterized by a sharp decrease as the lever swings toward its ultimate 90° movement. The spring of the resilient agency attains its maximum compression and the storing of its maximum excess pressure substantially at point B, represented in the diagrammatic showing by Fig. 9, in which the lever 30 has almost attained its ultimate positioning, being within a few degrees thereof, and with the lever and first link forming their most acute angle. As soon as the torque on pivot 31 has carried the lever the infinitesimally small distance necessary to initiate the beginning of the increase in the angular relation between the lever and first link, the follower button 50 engaging the cup 51, begins to deliver the stored excess energy in the form of torque about the pivot 29 augmenting the slight tendency then existing for the torque on the pivot 31 to be effective to increase the angle between the lever and link. The power thus stored and subsequently delivered forces the lever and link apart, and as the lower or second link has a fixed anchor, it results in the movement of the lever to its ultimate position of rest within the wing, at 90° from its starting point, and also forces the two links inwardly of the fuselage until the respective three pivots 31, 29 and 25 are in alignment. It is to be observed thus that the power requirements become definite, known, and predetermined, and can be calculated for each installation.

The landing gear linkage may be hydraulically locked in retracted position or it may be mechanically locked in any desired manner, for safety.

When it is to be extended, after unlocking or unlatching of any restraining devices used, an auxiliary hydraulic gear 52, having piston rod extension 53, is energized to impart lateral thrust on the linkage approximately opposite to the wheel 13, after which gravity assists the hydraulic cylinder 42 and connector 43, to extend the linkage to full extended position. The resilient means will obviously function in reverse order, being initially compressed and then permitted to expand, as the gear extends, but as the weight of the gear is now an assistance instead of a load, this makes no difference.

The advantages of the linkage system and of the improved landing gear shown will be obvious.

I claim as my invention:

1. In aircraft, a landing gear comprising a lever having and swinging in a predetermined arc about a substantially fixed pivot, a link substantially arcuately guided at one end and pivoted at the other to the lever and arranged for movement with the lever from a position of substantially vertical alignment with the lever through an acute angular relation thereto to a second position of greater angular divergence than said acute relation, a landing wheel operatively retractible and extensible with said link as it is substantially arcuately guided, and means wholly carried by the linkage comprised of the lever and link effective to urge the lever and link from their most acute angular relationship toward their ultimate greater angular divergence.

2. In aircraft, a landing gear comprising a lever having and swinging in a predetermined arc about a substantially fixed pivot, a link substantially arcuately guided at one end and pivoted at the other to the lever and arranged for movement with the lever from a position of substantial alignment with the lever through an acute angular relation thereto to a second position of greater angular divergence than said acute relation, a landing wheel operatively associated with said link and extensible and retractible as the link is arcuately guided, means operatively associated with and between the lever and link only and responsive to the angular relations between them effective to urge the lever and link from their most acute relationshop toward their second position to complete wheel retraction.

3. In aircraft, a landing gear comprising a lever having a pivot, motor means for swinging the lever on said pivot through a predetermined arc, a link substantially arcuately guided at one end and pivoted to the lever at the other end and arranged for movement with the lever through said arc during which the angular relation between the lever and link attains an acute angle from which it increases before the end of said arc is attained, a landing wheel operatively associated with said link and extensible and retractible as the link is arcuately guided, motor means effective to deliver torque to the lever at said pivot, resilient means operatively associated with the lever and link only and effective to store energy during part of said arcuate movement and to deliver the energy in the form of torque when the angular relation attains the most acute to urge the lever and link toward a position of greater angular relation than the most acute.

4. In aircraft, a landing gear comprising a lever having an arc of substantially 90° of movement from the substantially vertical to the substantially horizontal, a link pivoted to the end of the lever and movable therewith in a path such as to progress from a position of substantial vertical alignment through a 90° relation toward a more acute angle and thereafter through a progressively increasing angle reapproaching 90°, means wholly carried by the linkage comprised of the lever and link effective to urge the lever and link toward an increased angular relation after the most acute angularity is attained, a landing wheel operatively associated with the link and extensible and retractible as it swings through its path with the lever.

5. In aircraft, a landing gear comprising a link, a lever having a fixed pivot, a link having one end pivoted to the lever, a second link having a fixed pivot substantially, the other end of the said first link being pivoted to the second link, means for moving the lever on its pivot through substantially 90° during which the first link moves from a position of substantial alignment with the lever through a position of acute angularity of less than 90° and thereafter toward an angularity approaching 90°, a spring device operatively associated with and wholly carried by the lever and link arranged to exert torque on the pivot between the lever and link to urge them to a more obtuse relationship subsequent to the acute relationship, a landing wheel operatively associated with the link and extensible and retractible as it swings through its path with the lever.

6. In aircraft, a landing gear comprising a lever having and swinging in a predetermined arc about an axis, a link substantially arcuately guided at one end and pivoted at the other to the lever and arranged for movement with the lever from a position of substantially vertical alignment with the lever through an acute angular relation thereto to a second position of greater angular divergence than said acute angular relationship, said lever and link comprising relatively pivoted members, and a preloaded spring device carried solely upon one of the pivoted members and arranged to bear upon the other of the pivoted members effective to urge the lever and link from their most acute toward their ultimate angular relationship, a landing wheel operatively associated with the link and extensible and retractible as it swings through its path with the lever.

7. In aircraft, a landing gear comprising a lever and a pair of links having pivotal mutual relation and movable from a position in which the lever and one link comprising relatively pivoted members are in an angular relation exceeding 90° through 90° of lever movement to a more acute angle and then reapproach the 90° relation, means for moving the lever to secure the movement of the linkage comprised of the lever and the respective links, and resilient means effective between the lever and one link and wholly carried by one of said members to store energy during the approach to the acute angular relation and to deliver stored energy as torque at the pivot between the lever and one link to urge the reapproachment toward 90°, and a landing gear journalled to the other of said links.

8. In landing gears for aircraft, a lever having a fixed pivot, a motor device effective on the lever to develop torque at the pivot of said lever, a shock link pivoted to an end of the lever, a wheel-carrying link having a substantially fixed pivot and being pivotally connected to the shock link, said motor device effective to align the lever and shock link with the lever pivot and the pivot between the first and second mentioned links in substantial vertical alignment for landing purposes, said linkage comprised of the first and second links movable with the lever to retract the wheel-carrying link on its axis to a position in which the axis of the wheel-carrying link the pivot between the respective links and the pivot between the lever and the shock link are in substantial alignment and the wheel-carrying link has been swung through substantially 90°.

9. In aircraft, a body having a substantially vertical wall, a wing mounted on the body and extending laterally of said wall, a hollow fairing having an open end and extending laterally of the wall below the wing, the wall having channels extending on each side of the fairing, the fairing having longitudinal slots communicating with the respective channels to form a continuous channel through the fairing, the wing having a longitudinal channel communicating with the channel above the fairing as a continuation thereof, a bracket pivoted in the channel below the fairing, a wheel journalled on said bracket, a lower toggle link pivoted to the bracket and of such length as to lie in the channel above the fairing, an upper toggle link pivoted at one end to the lower link and at the other end in the channel in the wing and of such length as to lie in said wing channel, means for controlling the pivotal relations of the toggle links so arranged that when the wheel is disposed in the fairing the toggles lie in the said upper and wing channels while the bracket lies in the said lower channel, and means closing the channels after the parts are housed therein.

10. In aircraft, a body having a substantially vertical wall, a wing mounted on the body and extending laterally of said wall, a hollow fairing having an open end and extending laterally of the wall below the wing, the wall having channels extending on each side of the fairing, the fairing having longitudinal slots communicating with the respective channels to form a continuous channel through the fairing, the wing having a longitudinal channel communicating with the channel above the fairing as a continuation thereof, a bracket pivoted in the channel below the fairing, a wheel journalled on said bracket, a lower toggle link pivoted to the bracket and of such length as to lie in the channel above the fairing, an upper toggle link pivoted at one end to the lower link and at the other end in the channel in the wing and of such length as to lie in said wing channel, means for controlling the pivotal relations of the toggle links so arranged that when the wheel is disposed in the fairing the toggles lie in the said upper and wing channels while the bracket lies in the said lower channel, and means closing the channels after the parts are housed therein, said lower channel terminating in the said wall above the chine of the aircraft, and said bracket so arranged as to swing the wheel from and to operative landing position without rupturing or severing such chine.

11. In landing gears for aircraft, a lever having a fixed pivot, a motor device effective on the lever to develop torque at the pivot of the lever, a shock link pivoted to an end of the lever, a wheel-carying link having a substantially fixed pivot and being pivotally connected to the shock link, said motor device effective to align the lever and shock link with the lever pivot and the pivot between the shock and wheel-carrying links in substantially vertical relation for landing purposes, said shock and wheel-carrying links being movable with the lever to retract the wheel-carrying link toward 90° retraction toward a position in which the axis of the wheel-carying link the pivot between the respective links and the pivot betwen the shock link and the lever approach alignment, and auxiliary means operatively associated with the above described linkage effective to impose sufficient torque at the pivot between the lever and shock link as to substantially complete the 90° retraction of the wheel-carrying link.

12. A landing gear as set forth in claim 11 further characterized by the fact that the said auxiliary means comprises a compressible preloaded spring device.

13. In landing gears for aircraft, a fuselage, a wing extending from the fuselage, a lever pivoted in the wing spaced from the fuselage, a shock link pivoted to the lever, a wheel-carrying link pivoted to the fuselage, a wheel journalled in the wheel-carrying link, a motor in the wing operatively associated with the lever, a preloaded spring mounted on the shock link in position to engage the lever in a predetermined angular relation of the lever and link effective to deliver torque at the pivot between the lever and shock link to move the wheel-carrying link on its axis and the wheel toward retraction.

14. In landing gears for aircraft, a lever having a fixed pivot, a link pivoted at one end to the lever, a wheel-carrying link having a fixed pivot and pivoted to the first link and in the extended position of the gear having an angular relation substantially perpendicular to the first link, the wheel-carrying link being swingable to dispose its wheel in substantial horizontalism, with the links in approximate alignment with the axes of the first link at both ends in substantial alignment with the axis of the wheel-carrying link, power means for moving the lever, and means auxiliary to the power means for imposing such torque on an axis of the linkage comprised of the lever and links as to urge the links toward the last mentioned alignment.

15. In aircraft, a landing gear comprising a lever having a pivot and movable on the pivot through substantially 90°, linkage pivoted to the lever and movable therewith toward a desired position as a function of the continuously decreasing lateral force component of the moment about said first mentioned pivot during the movement, a landing wheel journalled on the linkage and retractible and extensible as a function of lever movement, and auxiliary means mounted wholly on the landing gear supplementing the diminishing lateral force component to urge the linkage to the desired position.

WILSON L. SUTTON.